(12) United States Patent
Mihlbauer et al.

(10) Patent No.: US 11,412,717 B1
(45) Date of Patent: Aug. 16, 2022

(54) MOVABLE SPOUT FOR AN AQUARIUM

(71) Applicant: Central Garden & Pet Company, Walnut Creek, CA (US)

(72) Inventors: Brad L. Mihlbauer, Mukwonago, WI (US); Ernie Katris, Franklin, WI (US); Phillip Bartoszek, New Berlin, WI (US)

(73) Assignee: Central Garden & Pet Company, Walnut Creek, CA (US)

( * ) Notice: Subject to any disclaimer, the term of this patent is extended or adjusted under 35 U.S.C. 154(b) by 142 days.

(21) Appl. No.: 16/867,112

(22) Filed: May 5, 2020

(51) Int. Cl.
*A01K 63/00* (2017.01)
*A01K 63/04* (2006.01)

(52) U.S. Cl.
CPC .......... *A01K 63/006* (2013.01); *A01K 63/045* (2013.01); *A01K 63/047* (2013.01)

(58) Field of Classification Search
CPC .. A01K 63/006; A01K 63/045; A01K 63/047; B65D 47/06; B65D 83/28
USPC ........... 119/259; 222/567, 566; 251/351–353
See application file for complete search history.

(56) References Cited

U.S. PATENT DOCUMENTS

| | | | |
|---|---|---|---|
| 3,288,110 A | 11/1966 | Jerome | |
| 3,485,373 A | 12/1969 | Powers | |
| 3,511,376 A | 5/1970 | Sesholtz | |
| 3,513,978 A | 5/1970 | Newsteder | |
| 3,651,785 A | 3/1972 | Quinn | |
| 3,863,635 A * | 2/1975 | Swatman | A61C 17/12 433/95 |
| 3,983,843 A | 10/1976 | Johnson | |
| 4,036,756 A | 7/1977 | Dockery | |
| 4,039,453 A | 8/1977 | Horvath | |
| 4,093,547 A | 6/1978 | Sherman et al. | |
| 4,154,681 A | 5/1979 | Shields et al. | |
| 4,163,035 A | 7/1979 | Gorsky | |
| 4,206,719 A | 6/1980 | Faris | |
| 4,220,530 A | 9/1980 | Gabriele | |
| 4,282,095 A | 8/1981 | Tsuhako | |
| 4,285,813 A | 8/1981 | Stewart et al. | |
| 4,490,250 A | 12/1984 | Dockery | |
| 4,512,885 A | 4/1985 | Willinger | |
| 4,601,821 A | 7/1986 | Sherman et al. | |
| 4,620,924 A | 11/1986 | Goldman et al. | |
| 4,684,462 A | 8/1987 | Augustyniak | |
| 4,761,227 A | 8/1988 | Willinger et al. | |
| 4,802,980 A | 2/1989 | Gilkey | |
| 4,807,565 A | 2/1989 | Hawthorne | |
| 4,820,410 A | 4/1989 | Cavalcante | |
| 4,842,727 A | 6/1989 | Willinger et al. | |

(Continued)

*Primary Examiner* — Brady W Frazier
*Assistant Examiner* — Zoe Tam Tran

(57) ABSTRACT

An aquarium includes a container defining a perimeter and an aquarium space, a filter space arranged to receive a fluid, and a filter holder coupled to the container. The filter holder defines the filter space and is operable to direct the fluid from the filter space into the container. A pump operates to draw the fluid from the container and a spout is coupled to the pump to selectively receive the fluid. The spout includes a first leg that extends along a first axis and a second leg that extends along a second axis and defines an outlet, The spout is movable along the first axis between an on position in which fluid from the pump flows through the spout and is discharged through the outlet and an off position in which no fluid flows through the spout.

15 Claims, 14 Drawing Sheets

(56) References Cited

U.S. PATENT DOCUMENTS

| | | |
|---|---|---|
| 4,895,646 A | 1/1990 | Willinger |
| 4,936,981 A | 6/1990 | Baisley |
| 4,957,623 A | 9/1990 | Henzlik |
| 4,978,444 A | 12/1990 | Rommel |
| 4,997,559 A | 3/1991 | Ellis et al. |
| 5,002,660 A | 3/1991 | Sherman et al. |
| 5,096,576 A | 3/1992 | Szabo |
| 5,098,585 A | 3/1992 | Woltman et al. |
| 5,108,594 A | 4/1992 | Giovanetti et al. |
| 5,139,656 A | 8/1992 | Gonnello |
| 5,160,607 A | 11/1992 | Thiemer et al. |
| 5,171,438 A | 12/1992 | Korcz |
| 5,172,650 A | 12/1992 | Hsu |
| 5,228,986 A | 7/1993 | Ellis et al. |
| 5,240,596 A * | 8/1993 | Chesnut ............... A01K 63/10 |
| | | 119/232 |
| 5,242,582 A | 9/1993 | Marioni |
| 5,245,945 A | 9/1993 | Liao |
| 5,290,436 A | 3/1994 | Danner |
| 5,306,421 A | 4/1994 | Weinstein |
| 5,397,463 A | 3/1995 | Woltmann |
| 5,401,401 A | 3/1995 | Hickok et al. |
| 5,409,603 A | 4/1995 | Tsung |
| 5,419,831 A | 5/1995 | Fuerst et al. |
| 5,423,978 A | 6/1995 | Snyder et al. |
| 5,453,182 A | 9/1995 | Kikuta |
| 5,474,673 A | 12/1995 | Ludlow |
| 5,501,790 A | 3/1996 | Wiedemann |
| 5,514,280 A | 5/1996 | Logan |
| 5,518,611 A | 5/1996 | Bresolin |
| 5,585,010 A | 12/1996 | Dockery |
| 5,603,831 A | 2/1997 | Hickok |
| 5,618,428 A | 4/1997 | Oslund |
| 5,628,281 A | 5/1997 | Kelley |
| 5,628,905 A | 5/1997 | Montalbano |
| 5,632,887 A | 5/1997 | Gargas et al. |
| 5,679,253 A | 10/1997 | Fuerst et al. |
| 5,728,293 A | 3/1998 | Guoli et al. |
| 5,779,885 A | 7/1998 | Hickok et al. |
| 5,853,591 A | 12/1998 | Snyder et al. |
| 5,965,016 A * | 10/1999 | Suchowski ............ C02F 3/085 |
| | | 210/167.22 |
| 6,202,597 B1 | 3/2001 | Hsiung |
| 6,202,677 B1 | 3/2001 | Chen |
| 6,523,498 B1 | 2/2003 | Shyu |
| 6,797,163 B2 | 9/2004 | Carley et al. |
| 6,843,909 B1 | 1/2005 | Woltmann |
| 6,869,530 B1 | 3/2005 | Venezia |
| 7,001,509 B1 | 2/2006 | Lin |
| 7,022,227 B1 | 4/2006 | Liao |
| 7,241,379 B2 | 7/2007 | Agresta |
| 7,252,762 B2 | 8/2007 | Carley |
| 7,273,547 B2 | 9/2007 | Ogawa |
| 7,288,189 B2 | 10/2007 | Bonifer |
| 7,316,775 B2 | 1/2008 | Carley et al. |
| 7,425,274 B1 | 9/2008 | Helfet |
| 7,429,321 B2 | 9/2008 | Willinger |
| 7,488,417 B2 | 2/2009 | Chauquet et al. |
| 7,569,139 B2 | 8/2009 | Mihlbauer et al. |
| 7,594,998 B2 | 9/2009 | Mihlbauer et al. |
| 7,601,259 B2 | 10/2009 | Mihlbauer et al. |
| 7,618,534 B2 | 11/2009 | Mihlbauer et al. |
| 7,628,913 B2 | 12/2009 | Willinger |
| 7,638,044 B2 | 12/2009 | Huehn et al. |
| 7,651,609 B2 | 1/2010 | Huehn |
| 7,708,883 B2 | 5/2010 | Wong |
| 7,771,592 B2 | 8/2010 | Mihlbauer et al. |
| 7,832,358 B2 | 11/2010 | Tsai |
| 7,927,483 B2 | 4/2011 | Huehn |
| 8,132,534 B2 | 3/2012 | Arita et al. |
| 8,453,605 B2 | 6/2013 | Tominaga et al. |
| 9,221,668 B1* | 12/2015 | Reyniers ............. A01K 63/006 |
| 9,788,533 B2 | 10/2017 | Allen et al. |
| 2003/0116489 A1* | 6/2003 | Terato ................ A01K 63/045 |
| | | 210/167.21 |
| 2003/0205512 A1 | 11/2003 | Chen |
| 2004/0050759 A1 | 3/2004 | Ogawa |
| 2004/0222137 A1 | 11/2004 | Hashimoto |
| 2005/0258086 A1* | 11/2005 | Lin .................... A01K 63/045 |
| | | 210/167.27 |
| 2006/0102537 A1 | 5/2006 | Hochgesang |
| 2006/0102538 A1 | 5/2006 | Chang |
| 2007/0138075 A1 | 6/2007 | Chang |
| 2007/0262008 A1* | 11/2007 | Mihlbauer ........... A01K 63/045 |
| | | 210/167.27 |
| 2007/0262012 A1 | 11/2007 | Wong |
| 2008/0272156 A1* | 11/2008 | Dyson ................ A47J 31/4482 |
| | | 222/504 |
| 2009/0056638 A1 | 3/2009 | Ting |
| 2009/0178623 A1 | 7/2009 | Ford |
| 2009/0255480 A1 | 10/2009 | Tsai |
| 2010/0236489 A1 | 9/2010 | Arita |
| 2010/0307971 A1* | 12/2010 | Wu ..................... A01K 63/045 |
| | | 210/610 |
| 2011/0162585 A1 | 7/2011 | Tominaga et al. |
| 2012/0152985 A1* | 6/2012 | Gauthier .................. C25C 3/14 |
| | | 222/567 |
| 2013/0152866 A1* | 6/2013 | Turover ............... A01K 63/045 |
| | | 119/264 |
| 2013/0240575 A1* | 9/2013 | Basic ........................ B65D 1/32 |
| | | 222/568 |
| 2013/0284107 A1 | 10/2013 | Lari |
| 2014/0216351 A1 | 8/2014 | Blake |
| 2015/0000607 A1 | 1/2015 | Reid et al. |
| 2019/0151782 A1* | 5/2019 | Himes ................... B01D 35/30 |
| 2019/0166809 A1* | 6/2019 | Yu ....................... F04D 15/0016 |
| 2019/0269108 A1* | 9/2019 | Watson ................ A01K 63/045 |

* cited by examiner

MOVABLE SPOUT FOR AN AQUARIUM

BACKGROUND

Aquariums are often kept in homes or offices as decorative elements. In order to maintain the environment for any animals or plants in the aquarium it is often necessary to circulate the fluid (generally water) within the tank or container and to sometimes change some or all of the fluid. In most aquariums, the quantity or rate of water filtration is fixed by the pump size. The filtering and water change processes can be messy and often include some water spillage.

BRIEF SUMMARY

An aquarium includes a container defining a perimeter and an aquarium space, a filter space arranged to receive a fluid, and a filter holder coupled to the container. The filter holder defines the filter space and is operable to direct the fluid from the filter space into the container. A pump operates to draw the fluid from the container and a spout is coupled to the pump to selectively receive the fluid. The spout includes a first leg that extends along a first axis and a second leg that extends along a second axis and defines an outlet. The spout is movable along the first axis between an on position in which fluid flows from the pump through the spout and is discharged through the outlet and an off position in which no fluid flows through the spout.

In another construction, an aquarium includes a container defining a perimeter and an aquarium space, a filter holder disposed within the perimeter and including a filter space, a pump space, and a pump discharge space, and a pump positioned within the pump space and operable to draw a fluid from the container and discharge the fluid into the pump discharge space. A spout includes a first leg that extends along a first axis from an inlet positioned to receive the fluid from the pump discharge space to a bend, and a second leg extends along a second axis from the bend to an outlet where the fluid is discharged. The spout is movable along the first axis between an on position in which fluid from the pump flows through the spout and is discharged through the outlet and an off position in which no fluid flows through the spout, and is further rotatable about the first axis and movable along the second axis from a retracted position to an extended position.

In another construction, a method of operating an aquarium includes operating a pump to draw a fluid from a container and to discharge the fluid into a pump discharge space, positioning an inlet end of a first leg of a spout in fluid communication with the pump discharge space, the first leg extending along a first axis, and coupling a second leg to the first leg, the second leg extending along a second axis and ending at an outlet. The method also includes rotating the spout about the first axis to position the outlet in a desired angular position, moving the spout along the first axis to a selected flow rate position between an on position having a maximum flow rate and an off position in which there is zero flow, and extending the spout along the second axis to a desired operating position between a retracted position and an extended position.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

It should be understood that the words or phrases used herein should be construed broadly, unless expressly limited. For example, the terms "include," "comprise," and "having" as well as derivatives should be interpreted as inclusive without limitation. The singular forms "a", "an" and "the" are intended to include the plural forms as well, unless the context clearly indicates otherwise. Further, the term "and/or" as used herein refers to and encompasses any and all possible combinations of one or more of the associated listed items.

Also, although terms such as "first", "second", "third" and so forth may be used herein to refer to various elements, information, functions, or acts, these elements, information, functions, or acts should not be limited by these terms and no specific order should be implied or interpreted. Rather these numeral adjectives are used to distinguish different elements, information, functions or acts from each other.

The phrase "adjacent to" may mean that an element is relatively near to but not in contact with another element or that the element is in contact with the other element, unless the context clearly indicates otherwise. In addition, in some contexts, "adjacent to" or "near to" and similar phrases simply mean that the element is closer to the other element described. For example, an element described as being "near" a first end of another element having a first end and a second end is simply positioned closer to the first end than to the second end.

Terms of degree such as "about", approximately, and the like are generally interpreted as being within well-known industrial tolerances for the particular feature. If no such standard exists, terms of degree should be interpreted as meaning plus or minus twenty percent unless another clear standard is provided.

None of the following description should be read as implying that any particular element, step, act, or function is an essential element, which must be included in the claim scope. In addition, while multiple variations, embodiments, and constructions are described, it should be understood that any aspect described with one embodiment, variation, or construction is equally applicable to the other variations, embodiments, or constructions unless explicitly stated otherwise.

Figure 1:
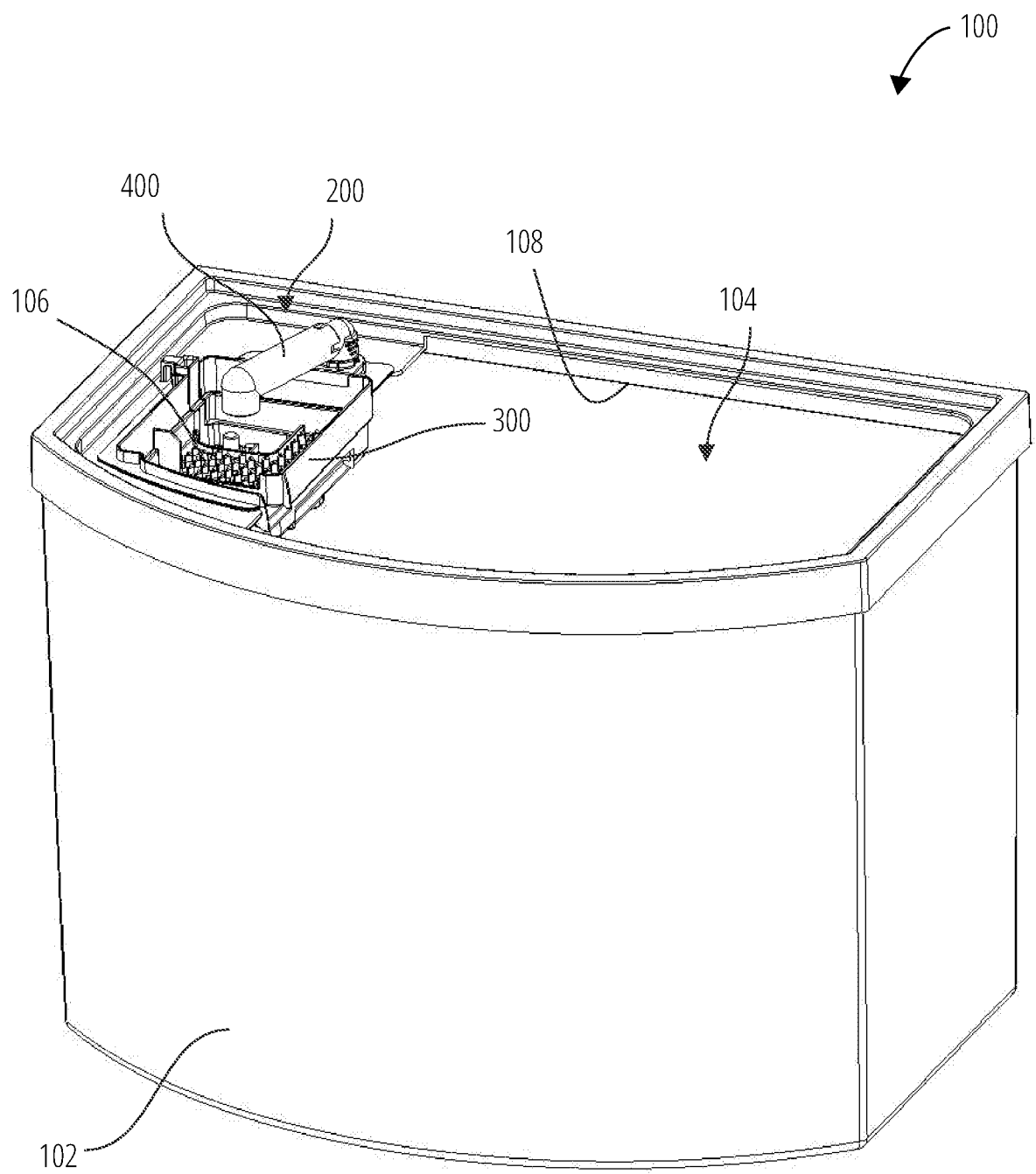
FIG. 1 illustrates an aquarium having a container that contains a fluid.

FIG. 1 illustrates one form of an aquarium 100 that is commonly used in homes or offices to display aquatic animals and plants, amphibians, reptiles, insects, or other small animals. The aquarium 100 of FIG. 1 is configured to hold aquatic animals and plants and includes a container 102 that defines an aquarium space 104 sized to receive a desired quantity of fluid (e.g., fresh water, saltwater, etc.).

A filter assembly 200 includes a filter holder 300 and a spout 400 with the filter holder 300 engaging the container 102 and supported at a desired height within the container 102. The filter holder 300 supports the spout 400 and defines a filter space 106 that is sized and shaped to receive a filter or filter media. In preferred constructions, a portion of the filter holder 300 is submerged in the fluid by filling the container 102 to a water line 108. With the fluid at the level of the water line 108, the filter and in particular the inlet side of the filter is disposed above the water line 108 with the discharge or outlet side of the filter being at or slightly above the water line 108 to assure that fluid is easily discharged into the aquarium space 104 without undue noise or splashing.

Figure 2:
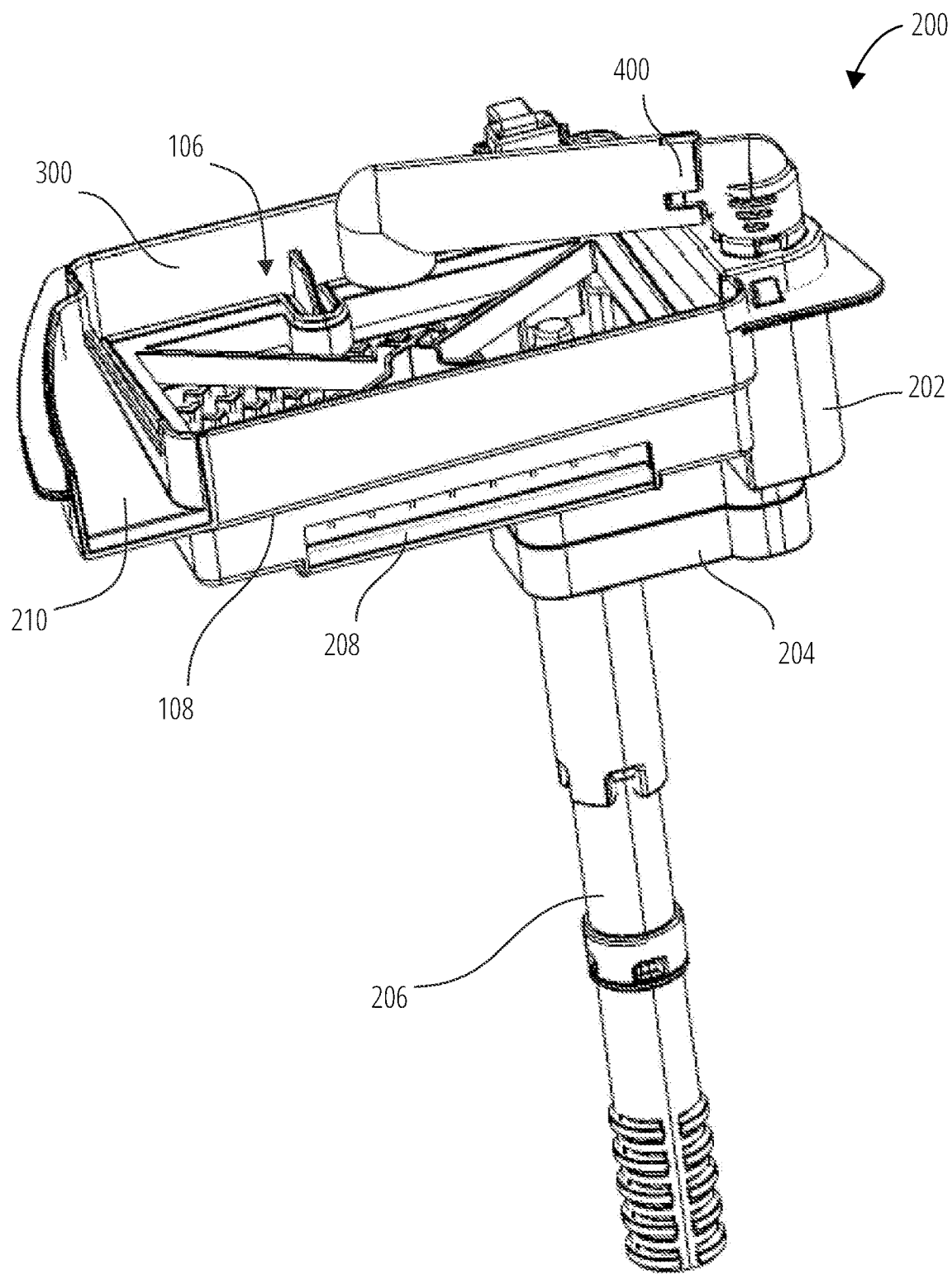
FIG. 2 illustrates a filter assembly for use with the aquarium of FIG. 1.

With reference to FIG. 2, the filter assembly 200 is illustrated in greater detail. In addition to the filter holder 300 and the spout 400, the filter assembly 200 further includes a pump discharge space 202, a pump housing 204, an intake tube 206, a discharge channel 208, and an overflow chute 210.

The intake tube 206 is an elongated generally hollow tube that includes one or more openings near a lowermost portion (the portion spaced furthest from the spout 400) that are arranged to allow for the admission of fluid into the intake tube 206. The end of the intake tube 206 opposite the lowermost portion attaches to the pump housing 204 to facilitate fluid communication between the pump housing 204 and the fluid in the aquarium 100. In the illustrated construction, the intake tube 206 is formed from a plurality of portions positioned in a telescoping arrangement. This arrangement allows the user to position the lowermost end of the intake tube 206 at any desired depth within the aquarium space 104.

The pump discharge space 202 is formed adjacent the pump housing 204 such that fluid can be delivered from the pump housing 204 to the pump discharge space 202. In preferred constructions, portions of the pump discharge space 202 and the pump housing 204 are formed as one piece with the filter holder 300. However, other constructions may include separately formed portions that are attached to the filter holder 300 to complete the pump discharge space 202 or the pump housing 204.

With continued reference to FIG. 2, the filter holder 300 defines the discharge channel 208 and the overflow chute 210. The discharge channel 208 is an elongated channel that is preferably arranged to rest just below the water line 108 and below the filter space 106. Fluid that passes through the filter space 106 and the filter disposed in the filter space 106 is generally discharged through the discharge channel 208. However, if for some reason, the fluid cannot pass through the filter or the filter space 106 at a sufficient rate, excess fluid can flow back into the aquarium space 104 via the overflow chute 210. In the illustrated construction, the overflow chute 210 terminates at an outlet end that is disposed at about the water line 108.

While the illustrated construction includes a filter holder 300 that defines the discharge channel 208 and the overflow chute 210 as part of the filter holder 300, other arrangements could include separate pieces that attach to the filter holder 300 to define parts of one or both of the discharge channel 208 and the overflow chute 210.

Figure 3:
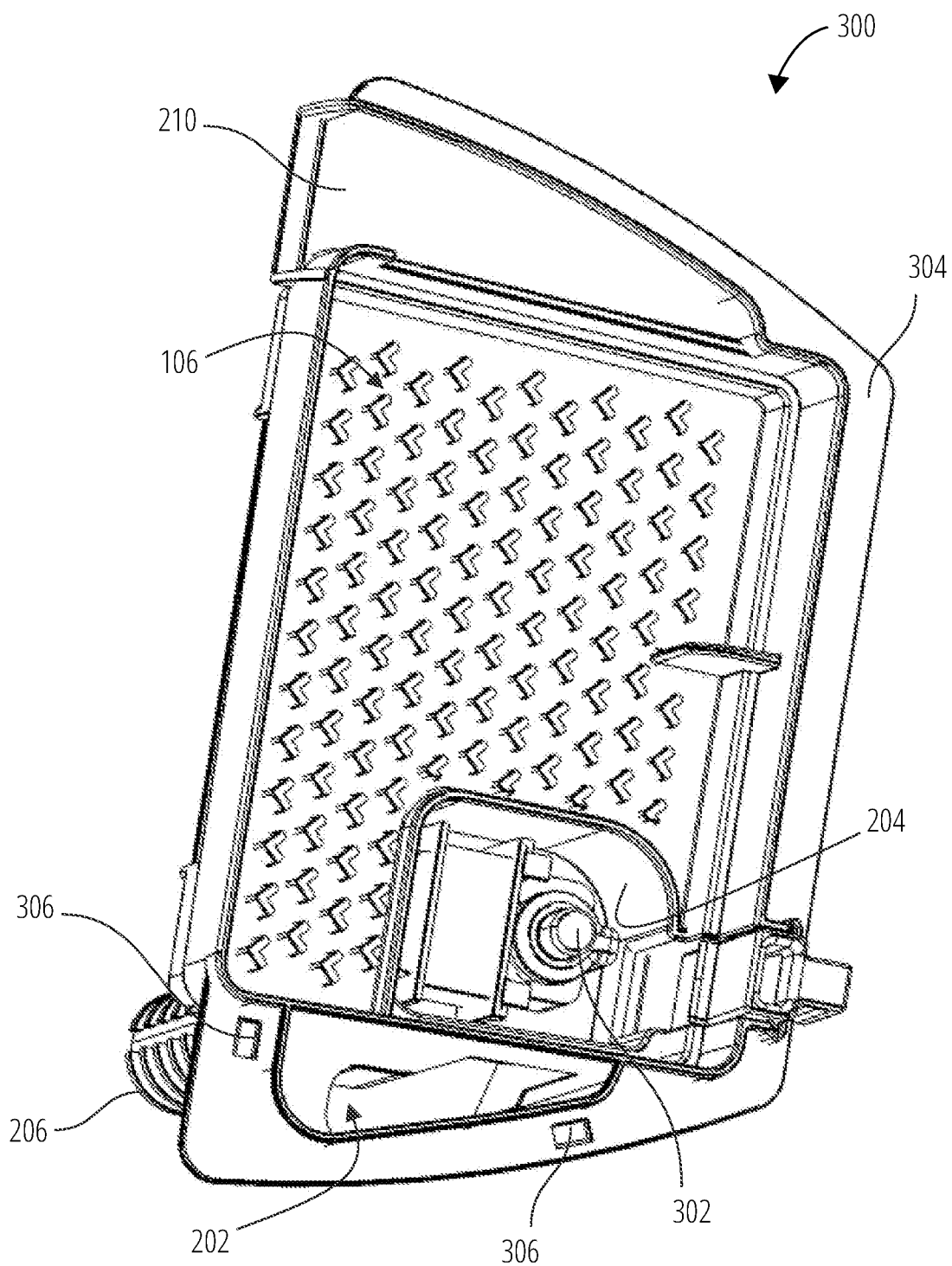
FIG. 3 illustrates a filter holder for use in the filter assembly of FIG. 2.

FIG. 3 illustrates the filter holder 300 with the filter and the spout 400 removed. A pump 302 is disposed within the pump housing 204 and operates to pump water from the intake tube 206 to the pump discharge space 202. With the spout 400 removed, the pump discharge space 202 defines an open top that, during operation is covered and at least partially sealed by the spout 400. In preferred constructions, the pump 302 includes an electric motor that drives an impeller to produce the desired water flow. In some constructions, flow rates of about fifty gallons per hour (190 liters/hour) are employed with higher and lower flow rates being suitable for different aquariums 100.

As illustrated in FIG. 3, the filter holder 300 includes a flange 304 that partially surrounds the filter holder 300 and provides a support mechanism for positioning the filter holder 300 on the edge of the container 102 to support the filter assembly 200 in the desired position. Of course, other support arrangements could be employed to position and support the filter holder 300 in the desired position.

Locking apertures 306 are formed in the flange 304 near the pump discharge space 202. In the illustrated construction, the locking apertures 306 are rectangular with other shapes and arrangements being possible.

Figure 4:
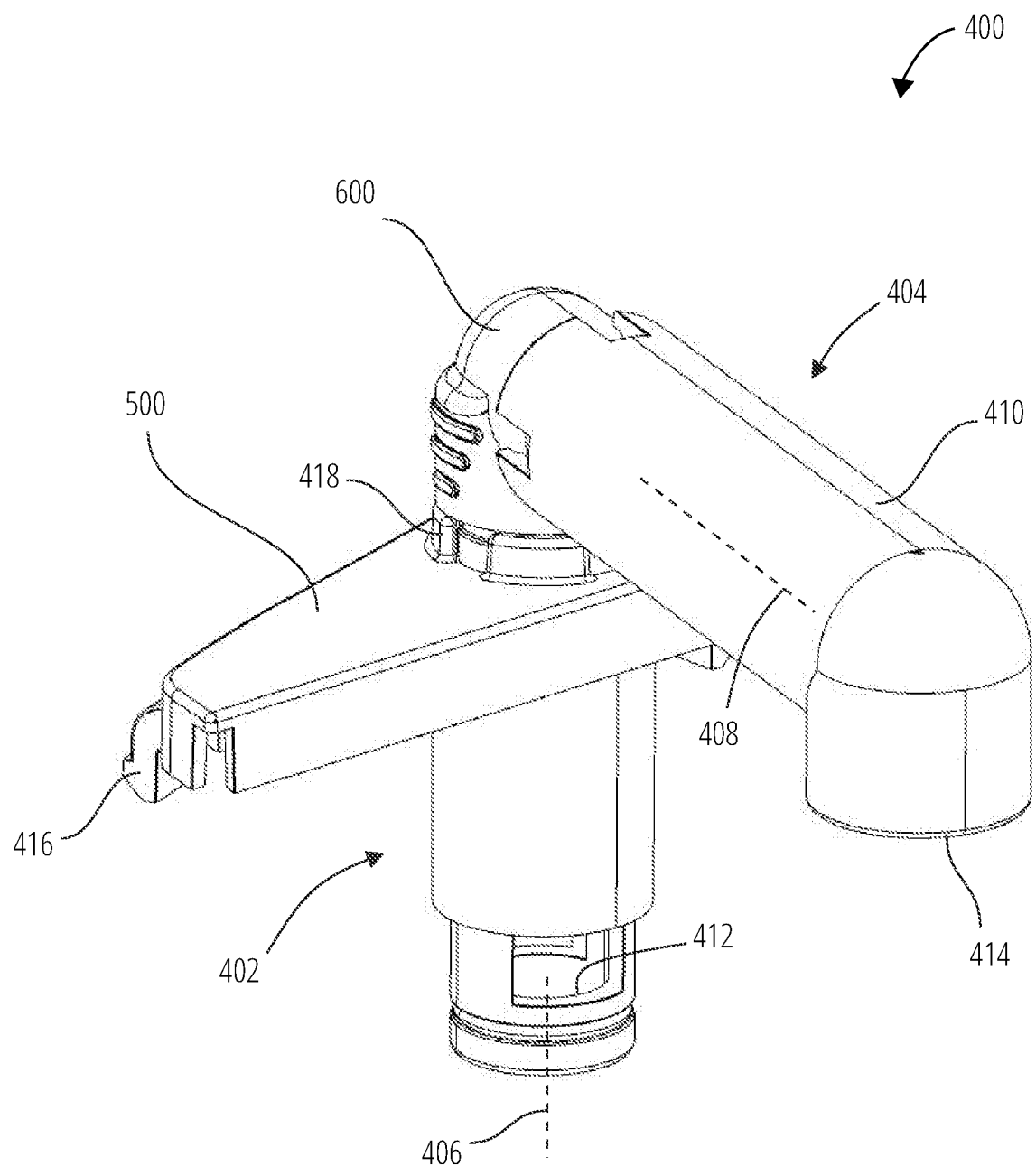
FIG. 4 illustrates a spout for use in the filter assembly of FIG. 2 and in an on position.

As illustrated in FIG. 4, the spout 400 is arranged to include a first leg 402 that extends along a first axis 406 and a second leg 404 that extends along a second axis 408. A bend is formed between the first leg 402 and the second leg 404 such that the first axis 406 and the second axis 408 are arranged substantially normal to one another. Of course, other angular arrangements could be employed if desired.

The first leg 402 is defined by a portion of a tube portion 500 and an angled member 600 while the second leg 404 is defined by another portion of the angled member 600 and an extendable portion 410. The extendable portion 410 is a substantially tubular member that defines a fluid outlet 414 at one end.

Figure 5:
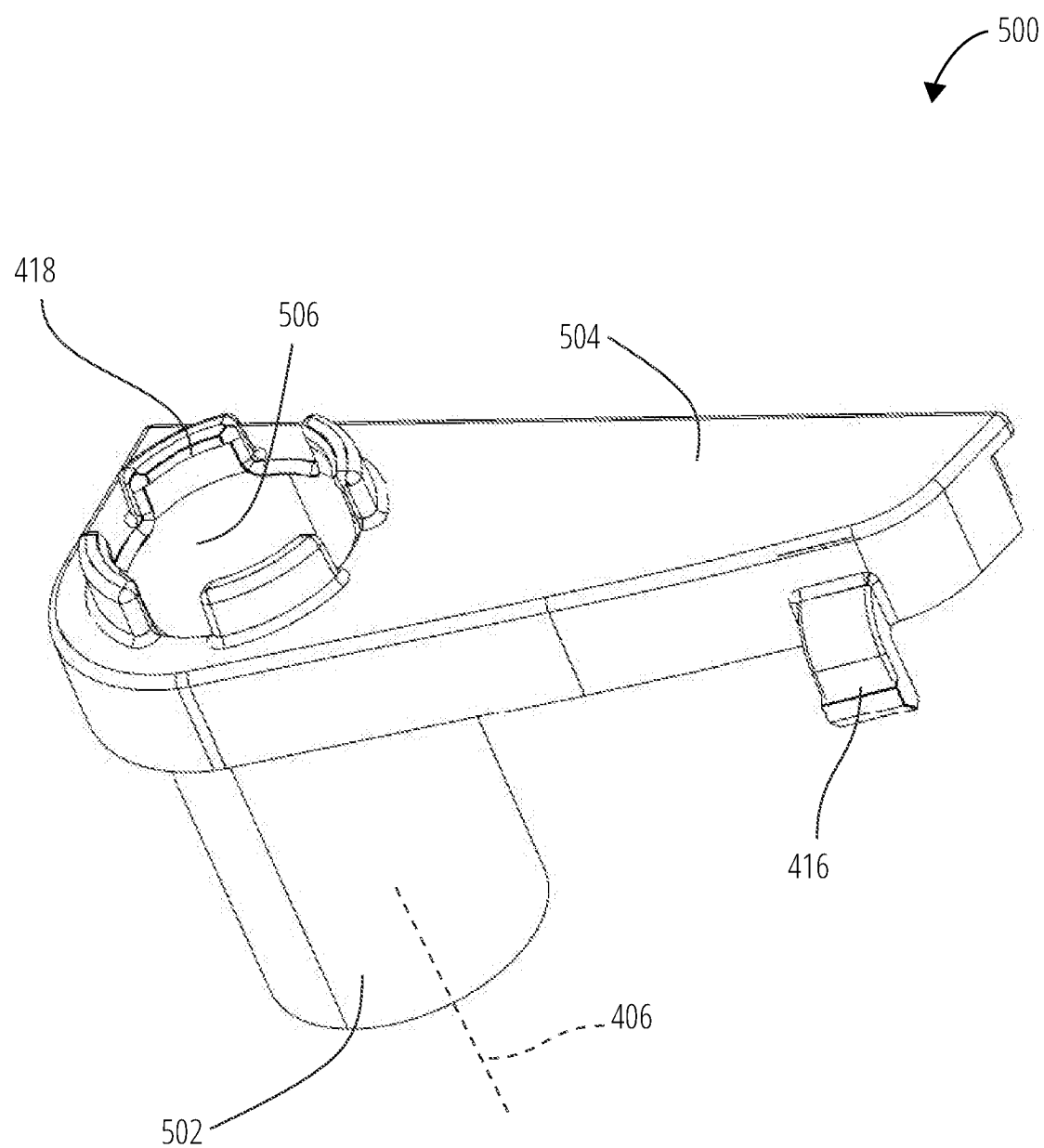
FIG. 5 illustrates a tube portion of the spout of FIG. 4.

As illustrated in FIG. 5, one construction of the tube portion 500 includes a one-piece component that defines an outer tube 502, a cover 504, and a tube passage 506. One or more hooks 416 are formed as part of the tube portion 500 as are one or more stand-offs 418. Of course, some or all of the aforementioned features and components could be formed separately and attached to one another (e.g., using adhesives) to define the tube portion 500.

The outer tube 502 extends along the first axis 406 and defines a hollow opening or tube passage 506. The stand-offs 418 are positioned outside of the tube passage 506 and extend above the cover 504 in the direction of the first axis 406. In the illustrated construction, four stand-offs 418 are provided. However, other constructions could include more or fewer stand-offs 418 as desired.

The cover 504 is shaped to cover the open top of the pump discharge space 202 and form at least a partial seal to inhibit leakage of fluid from the pump discharge space 202. The hooks 416 are arranged to each engage one of the locking apertures 306 to removably attach the tube portion 500 to the filter holder 300. It should be noted that a different number of hooks 416 could be employed or a different design or shape of the hooks 416 (e.g., threaded fasteners) could be employed. In addition, the shape of the cover 504 is not critical to the operation of the filter assembly 200 so long as it conforms with the shape of the opening of the pump discharge space 202.

Figure 6:
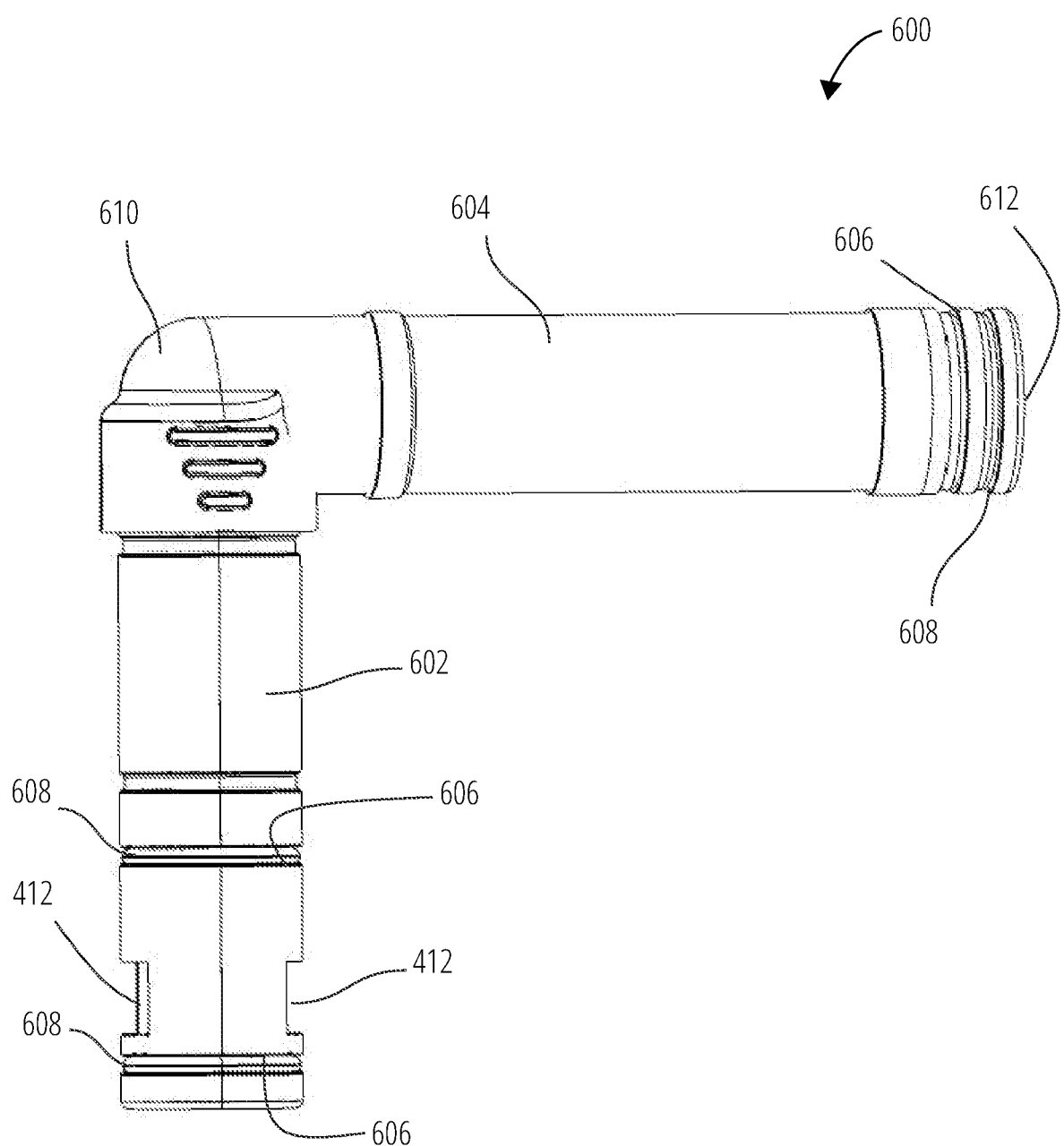
FIG. 6 illustrates an angled member of the spout of FIG. 4.

Turning to FIG. 6, the angled member 600 is illustrated in greater detail. The illustrated angled member 600 includes a first arm 602 that is formed as one piece with a second arm 604 or that is otherwise attached to the second arm 604. For example, in one construction, the first arm 602 threadably engages the second arm 604. In other constructions, an adhesive is used to attach the first arm 602 and the second arm 604. The first arm 602 defines two inlet apertures 412 with fewer or more inlet apertures 412 being possible. The inlet apertures 412 are formed in the sidewall of the first arm 602 near the end spaced from the second arm 604. A pair of O-ring grooves 606 are formed in the first arm 602 with one O-ring groove 606 positioned on either side of the inlet apertures 412. An O-ring 608 is positioned in each of the O-ring grooves 606. In most constructions, the O-rings 608 have a circular cross-section. However, other cross-sectional shapes or arrangements can be employed as desired.

The second arm 604 includes a bend 610 at one end and an outlet opening 612 at the opposite end. Thus, the second arm 604 cooperates with the first arm 602 to define a continuous flow path from the inlet apertures 412 to the outlet opening 612. A pair of O-ring grooves 606 are formed near the outlet opening 612 and receive a pair of O-rings 608. The O-rings 608 are arranged to engage an interior bore of the extendable portion 410 to form a seal therebetween.

Figure 7:
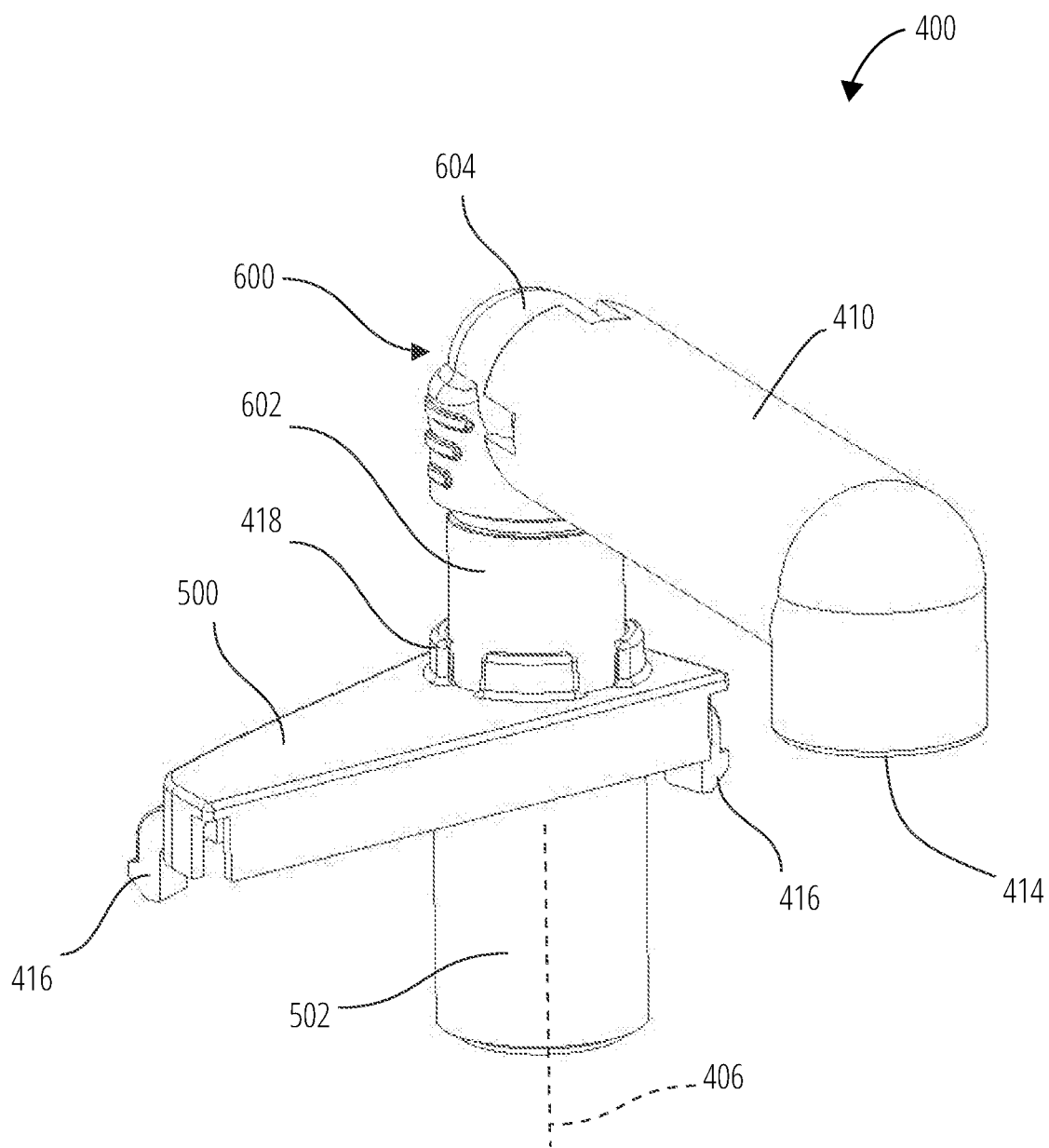
FIG. 7 illustrates the spout of FIG. 4 in an off position.

With reference to FIG. 4 and FIG. 7 some of the operation of the spout 400 will be described. As illustrated, the first arm 602 of the angled member 600 is positioned within the tube passage 506 such that the first arm 602, the second arm 604, and the extendable portion 410 are rotatable 360 degrees about the first axis 406.

In addition, the angled member 600 and the extendable portion 410 are movable with respect to the tube portion 500 along the first axis 406 between an on position illustrated in FIG. 4 and an off position illustrated in FIG. 7. In the on position (FIG. 4), the inlet apertures 412 are exposed and are positioned within the pump discharge space 202 such that fluid from the pump discharge space 202 can flow through the angled member 600, the extendable portion 410 and out through the fluid outlet 414. The second arm 604 contacts the stand-offs 418 to inhibit excess movement in the downward direction toward the on position. In one arrangement, the pump is sized to facilitate the pumping of about 50 gallons of fluid per hour (190 liters/hour). Of course, other arrangements could include larger or smaller pumps that are capable of pumping a greater volume or smaller volume of fluid as may be required.

In FIG. 7, the angled member 600 is moved upward along the first axis 406 to the off position. In this position, the inlet apertures 412 are located fully within the outer tube 502 and the O-rings 608 on either side of the inlet apertures 412 cooperate with the tube passage 506 to form a seal to inhibit the unwanted entry of fluid into the inlet apertures 412 such that no fluid flows through the angled member 600 or out of the fluid outlet 414.

It should be understood that the angled member 600 can be positioned at any point between the on position and the off position to achieve any desired flow rate between the maximum flow rate of the pump and no flow. For example, positioning the angled member 600 halfway between the on position and the off position may produce a flow rate of half the capacity of the pump. Thus, for the example discussed above, a flow rate of 25 g/hour (95 liters/hour) could be achieved. Of course, the angled member 600 and the extendable portion 410 can be rotated about the first axis 406 to any point around the first axis 406 regardless of the position of the angled member 600 between the on position and the off position.

Figure 8:
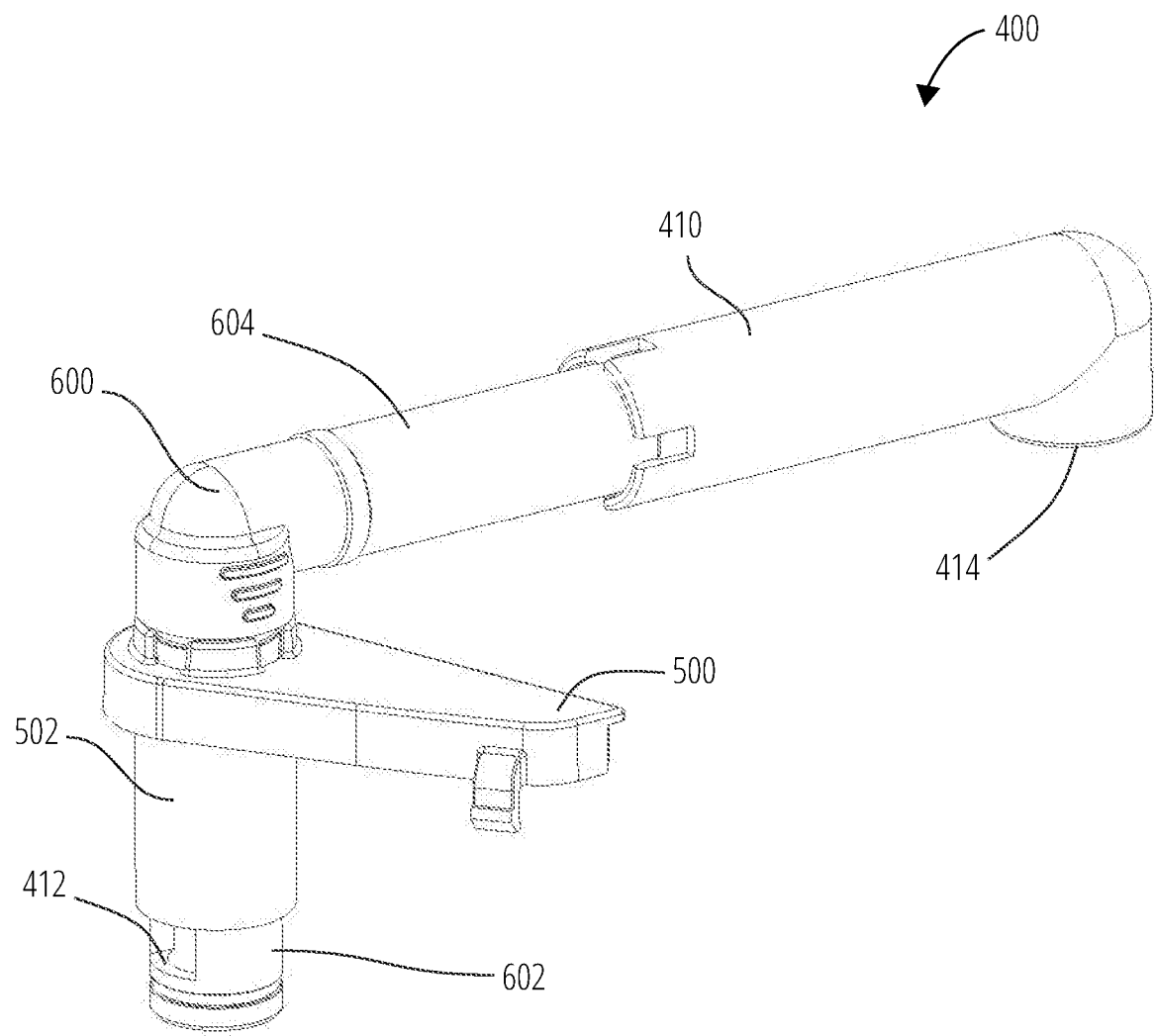
FIG. 8 illustrates the spout of FIG. 4 in the on position with an extension extendable portion in an extended position.

FIG. 8 illustrates another adjustment provided by the spout 400. Specifically, the extendable portion 410 engages the second arm 604 and is movable in a telescoping fashion with respect to the angled member 600 along the second axis 408 between a fully retracted position illustrated in FIG. 4 and FIG. 7 and a fully extended position illustrated in FIG. 8.

The O-rings 608 positioned on the end of the second arm 604 engage the interior of the extendable portion 410 and form a seal to inhibit unwanted leakage between the second arm 604 and the extendable portion 410.

Figure 9:
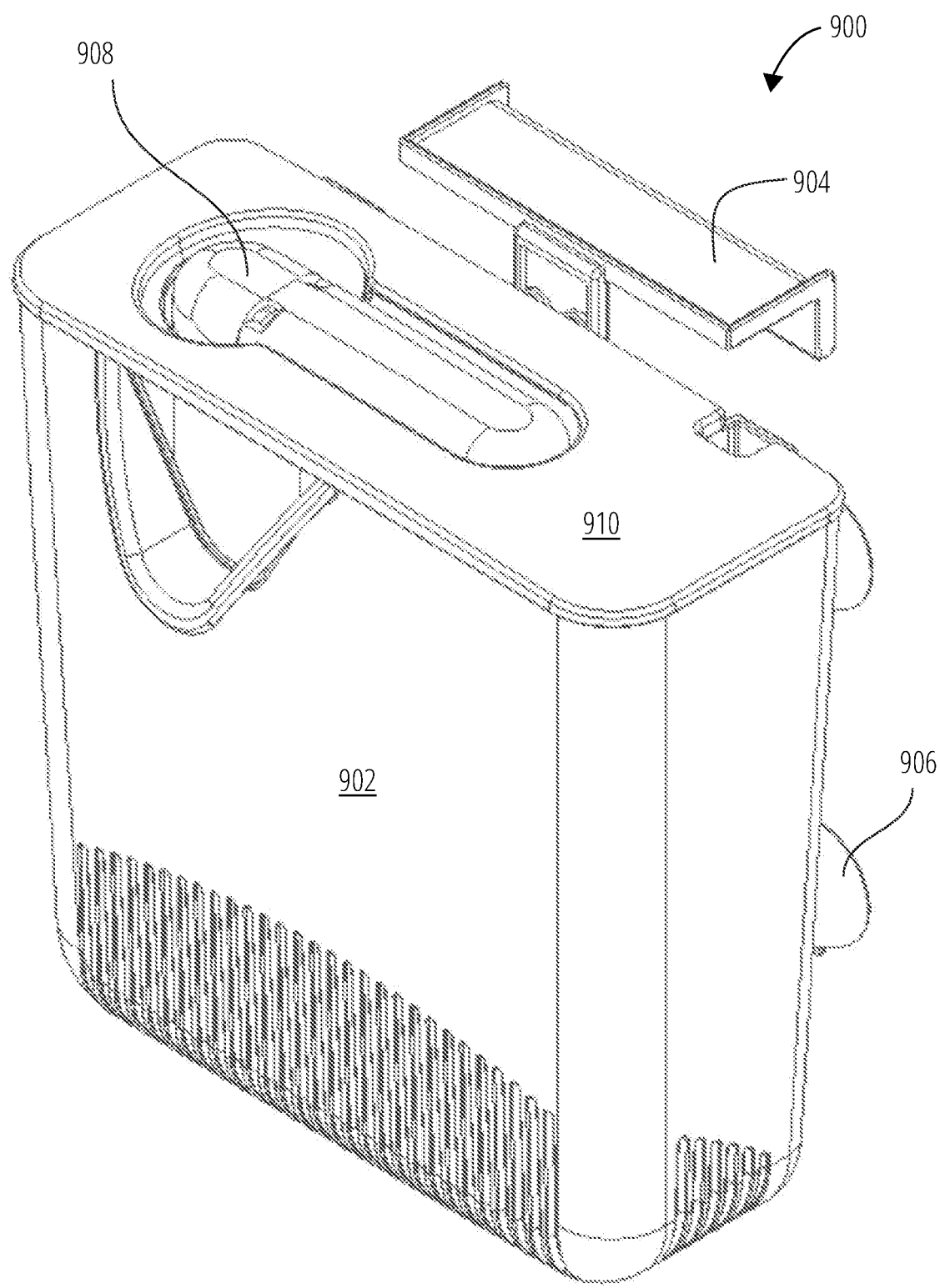
FIG. 9 illustrates another filter assembly including a spout in an operating or filtering position.

FIG. 9 illustrates another construction of a filter assembly 900 that is arranged to be disposed with the container 102 and substantially below the water line 108. The filter assembly 900 includes a filter housing 902 (or filter holder), a hanger 904, and one or more suction cups 906. The hanger 904 is arranged to engage the rim of the container 102 to hang the filter housing 902 within the container 102. The suction cups 906 engage a wall of the container 102 to inhibit unwanted movement of the filter housing 902.

The filter housing 902 defines an uppermost surface 910 that generally defines the top of the filter housing 902 when the filter housing 902 is positioned in an operating position within the container 102. An opening is formed in the uppermost surface 910.

The filter assembly 900 also includes a spout 908 that is similar to the spout 400 discussed with regard to FIGS. 1-8 and that is sized to fit within the opening in the uppermost surface 910. In FIG. 9, the spout 908 is positioned in an on or filtering position in which the pump cycles fluid through a filter element disposed within the filter housing 902. In this position, the spout 908 is fully at or below the level of the uppermost surface 910. Thus, the spout 908 is recessed within the filter assembly 900, and more specifically beneath the uppermost surface 910 during normal filtering operation. Of course, other constructions could include an arrangement in which some or all of the spout 908 is positioned at or above the level of the uppermost surface 910.

Figure 10:
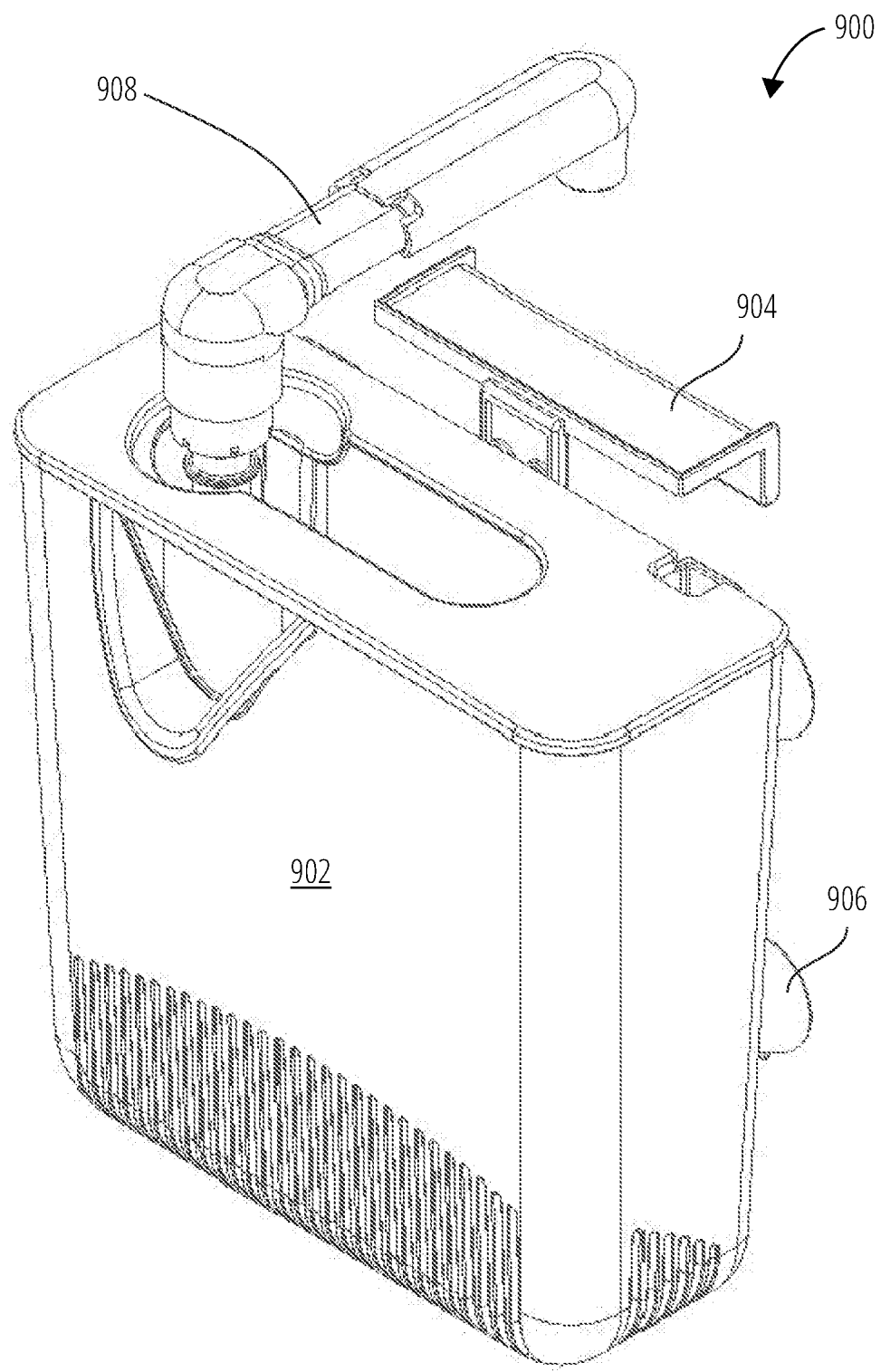
FIG. 10 illustrates the filter assembly of FIG. 9 with the spout in a second position.

FIG. 10 illustrates the spout 908 in a second position in which fluid is not cycled through the filter but rather is discharged out of the container 102 to allow for the changing of some or all of the fluid in the container 102. The spout 908 is substantially the same as the spout 400 and operates in much the same manner.

Figure 11:
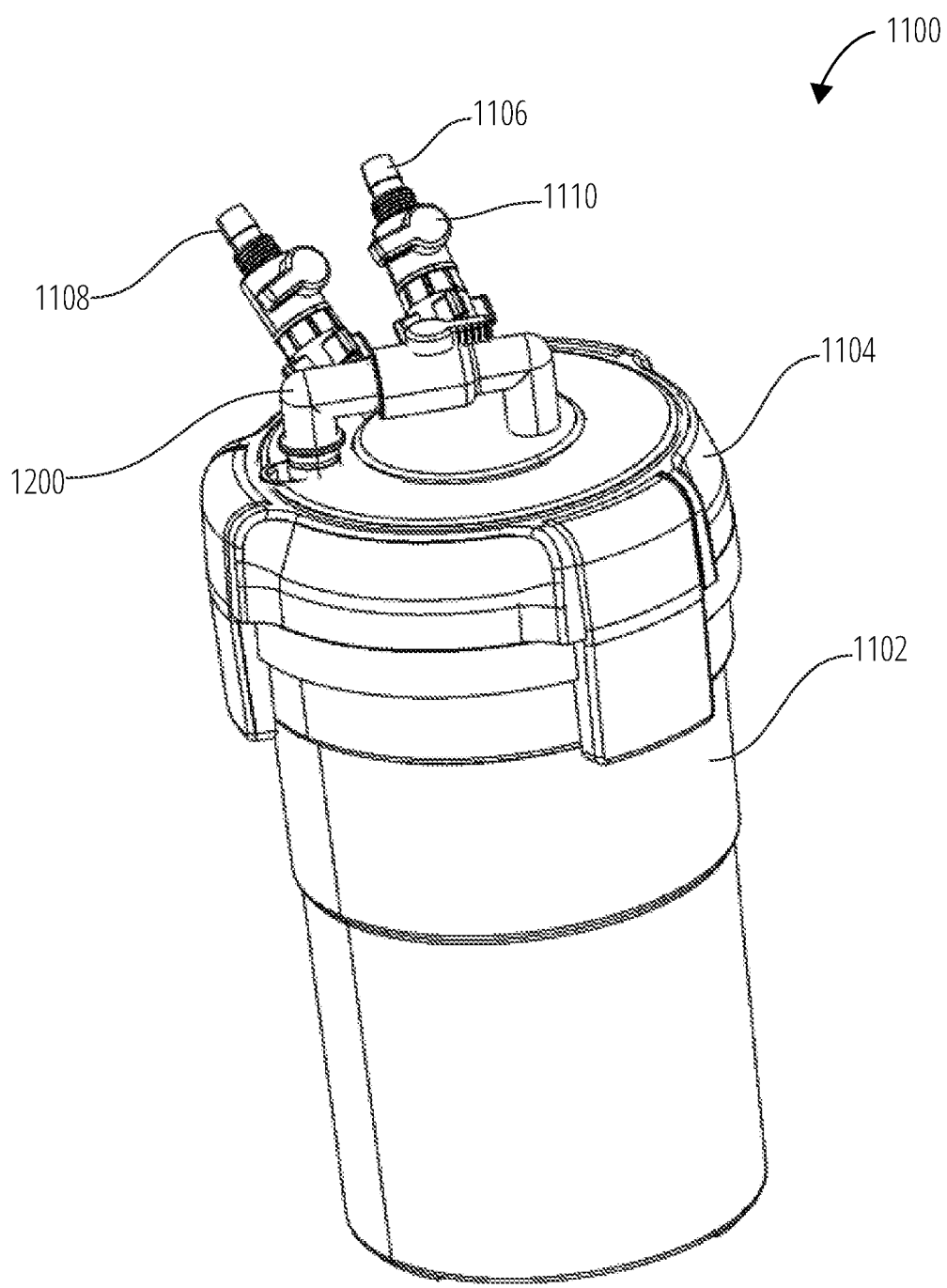
FIG. 11 illustrates another construction of a movable spout and a canister filter.

FIG. 11 illustrates a canister filter 1100 that is suitable for use in filtering fluid from an aquarium 100 or another container. The canister filter 1100 is arranged to be positioned external to the aquarium 100 rather than internal and includes a canister 1102, a canister top 1104, an inlet connection 1106, an outlet connection 1108, and a movable spout 1200. The canister 1102 defines an open space that contains one or more filtering elements that are selected to properly filter the fluid that is being filtered. In addition, the open space may contain piping or tubing arranged to direct the fluid being filtered along a desired path or through the various filter media in a desired order. The canister top 1104 is removably attached to the canister 1102 to enclose and substantially seal the open space.

The inlet connection 1106 passes through the canister top 1104 and provides a flow path for the fluid to be filtered to enter the open space for filtering. The actual arrangement and style of the inlet connection 1106 does not affect the canister filter 1100 so long as it is arranged to connect to the source of fluid to be filtered.

Similar to the inlet connection 1106, the outlet connection 1108 is provided to return the filtered fluid to the aquarium 100 or the source of fluid. As with the inlet connection 1106, the arrangement or style of the outlet connection 1108 is not critical to the operation of the canister filter 1100 so long as it is suitably connectable to the fluid source to return the filtered fluid.

In the illustrated construction, a valve 1110 is placed in each of the inlet connection 1106 and the outlet connection 1108 and is operable to turn the respective connection off and block any flow therethrough.

The movable spout 1200 is similar to the movable spouts described with regard to FIGS. 1 through 10 and is movable in both a vertical direction (parallel to the long axis of the canister), rotatable about the long axis of the canister, and extendable. The movable spout 1200 of the illustrated construction includes a valve 1110 to turn the flow through the movable spout 1200 on or off. However, many constructions omit this valve. As will be discussed in greater detail, the movable spout 1200 does have some differences from those already described.

Figure 12:
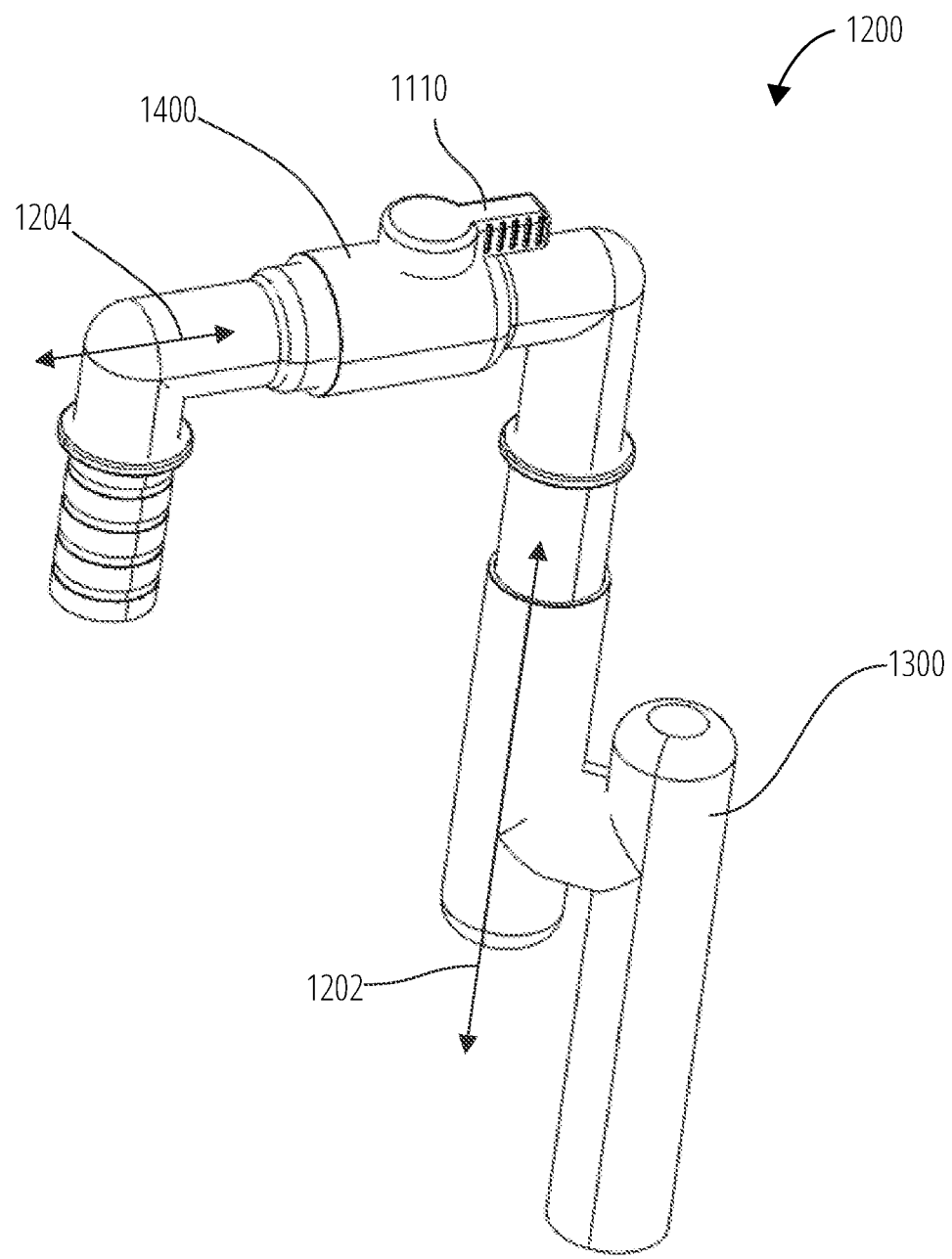
FIG. 12 illustrates the movable spout of FIG. 11.

FIG. 12 illustrates the movable spout 1200 in greater detail. In the illustrated construction, the movable spout 1200 includes a stationary portion 1300 and a movable portion 1400 movably coupled to the stationary portion 1300. As illustrated in FIG. 12, the movable portion 1400 is movable with respect to the stationary portion 1300 and the canister 1102 along a vertical axis 1202 and is also rotatable about the vertical axis 1202. An end of the movable portion 1400 is also movable along a horizontal axis 1204 to extend or retract the end. It should be noted that the terms "horizontal" and "vertical" are used herein to describe the preferred orientation of the movement based on the preferred orientation of the canister filter 1100. However, there is no requirement that the axis actually be horizontal or vertical in all uses or constructions.

Figure 13:
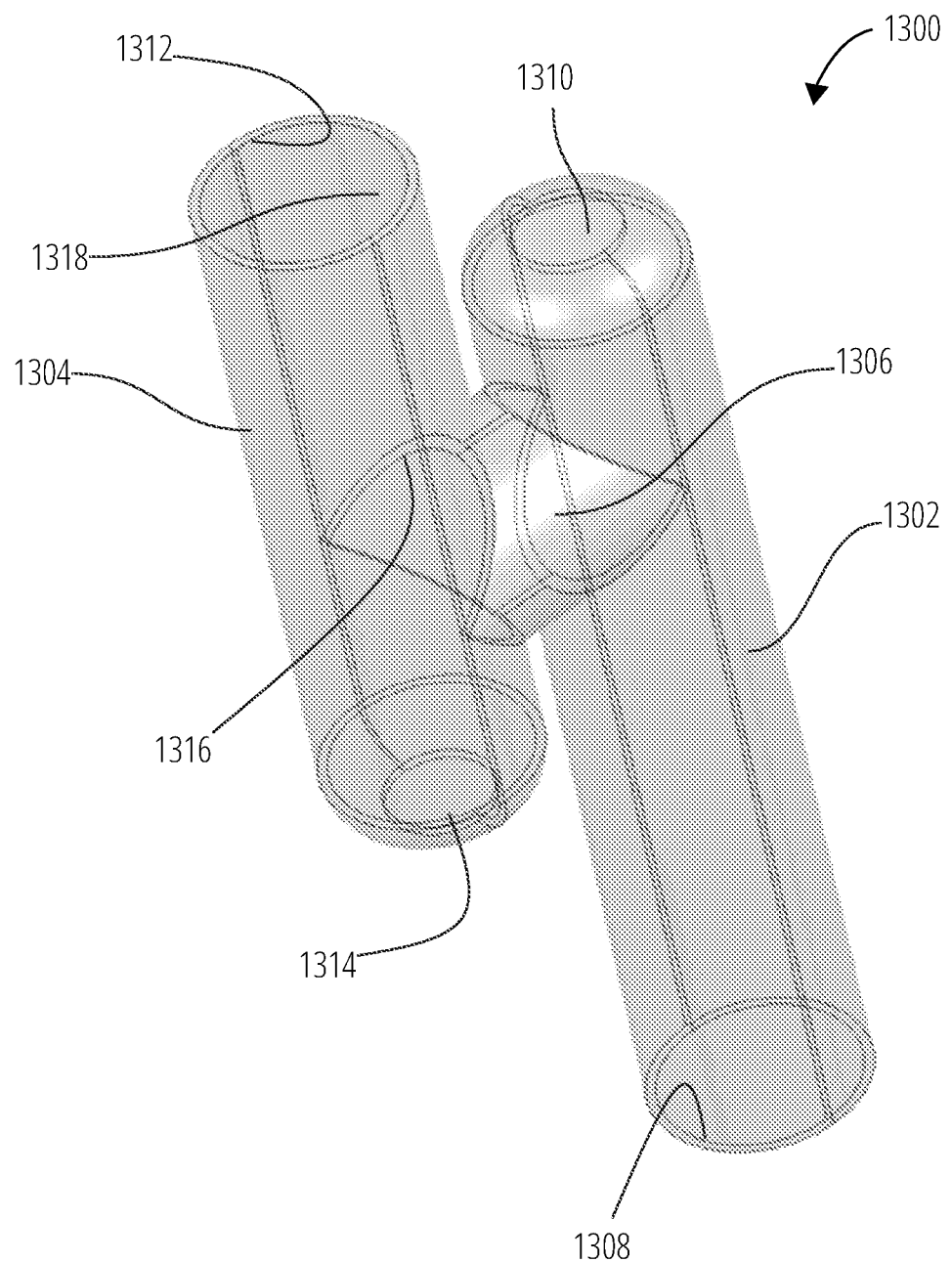
FIG. 13 illustrates a stationary portion of the movable spout of FIG. 12.

FIG. 13 illustrates the arrangement of the stationary portion 1300 with the walls of the stationary portion 1300 being illustrated as transparent to better illustrate the internal features. The stationary portion 1300 includes an intake tube 1302, an outlet tube 1304, and a transition tube 1306 that connects the intake tube 1302 to the outlet tube 1304. The stationary portion 1300 of the illustrated construction is formed as a single piece that is inseparable without destroying the piece. For example, some arrangements may include a glued, brazed, or welded arrangement or another arrangement that is formed as a single inseparable piece. However, other constructions could include a multi-piece arrangement that includes components that are removable attached to one another. For example, a threaded arrangement could be employed.

The intake tube 1302 includes an intake opening 1308 at one end and an intake tube closed end 1310 at the opposite end. The intake opening 1308 is positioned at a point in the canister filter 1100 where one would want to drain fluid. This could be near a bottom of the canister 1102 or it could be at any other level within the canister 1102. Preferably, the stationary portion 1300 is fixed within the canister 1102 such that this point is not adjustable. However, other constructions may allow for movement of the intake opening 1308 within the canister 1102.

The outlet tube 1304 includes an outlet tube opening 1312 at a first end of the outlet tube 1304 and an outlet tube closed end 1314 at the opposite end. The outlet tube 1304 defines an interior wall 1318 that is cylindrical and extends along a portion of the length of the outlet tube 1304.

The transition tube 1306 connects to the intake tube 1302 at a point near the intake tube closed end 1310 and connects to the outlet tube 1304 at a point near the outlet tube closed end 1314 to connect the intake tube 1302 to the outlet tube 1304. The transition tube 1306 defines a transition flow path 1316 between the intake tube 1302 and the outlet tube 1304.

As illustrated in FIG. 13, one construction of the stationary portion 1300 includes the intake tube 1302 and the outlet tube 1304 arranged along parallel offset axes with other arrangements being possible. The stationary portion 1300 defines a continuous flow path that extends from the intake opening 1308, through a portion of the intake tube 1302, along the transition flow path 1316, through a portion of the outlet tube 1304, and out the outlet tube opening 1312.

Figure 14:
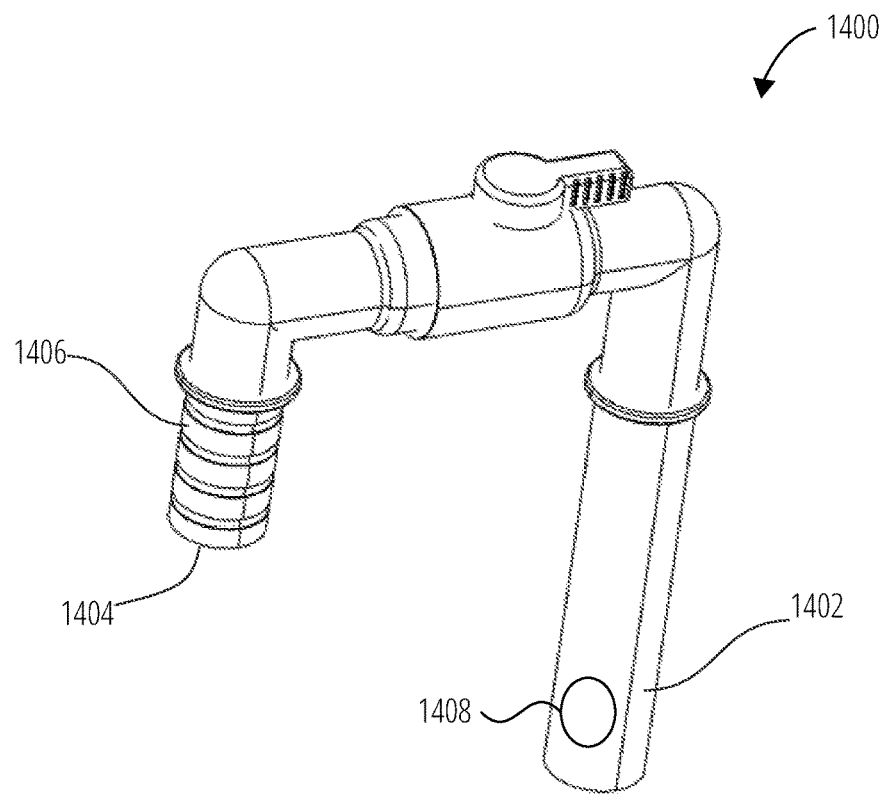
FIG. 14 illustrates a movable portion of the movable spout of FIG. 12.

As illustrated in FIG. 14, the movable portion 1400 includes an inlet tube 1402, an outlet opening 1404, and an outlet spout 1406. The inlet tube 1402 is a cylindrical tube portion sized to fit closely within the space defined by the interior wall 1318 of the stationary portion 1300. An inlet aperture 1408 is formed in the inlet tube 1402 to a provide for the entry of fluid into the movable portion 1400. In some constructions, O-rings (not shown) are positioned above and below the inlet aperture 1408 to form seals between the inlet tube 1402 and the interior wall 1318. The position of the inlet aperture 1408 is selected such that the movable portion 1400 must be in a selected vertical position along the vertical axis 1202, as well as a selected rotational position about the vertical axis 1202 for fluid to flow into the movable portion 1400 as will be discussed in greater detail.

The outlet spout 1406 is arranged to be received in an aperture in the canister top 1104 or the canister 1102 to allow for the return of any fluid into the canister 1102 when the movable portion 1400 is in the stowed position as illustrated in FIG. 11. Any flow that passes through the movable portion 1400 exits via the outlet opening 1404.

The operation of the movable spout 1200 is best described with reference to FIG. 11 and FIG. 12. As noted above, the movable spout 1200 is illustrated in FIG. 11 in the stowed position. In this position, flow bypasses the movable spout 1200 completely, or flows through the movable spout 1200 to the outlet opening 1404 that then returns the fluid to the canister 1102.

As illustrated in FIG. 12, the inlet tube 1402 of the movable portion 1400 is movably positioned within the space defined by the interior wall 1318 of the outlet tube 1304. In order to move the movable spout 1200 into an on position in which flow is free to pass, the movable portion 1400 is moved along the vertical axis 1202 until the inlet aperture 1408 is at the same elevation and therefore in fluid communication with the transition flow path 1316. In constructions that include O-rings, one O-ring would form a seal above the transition flow path 1316 and the second O-ring would form a seal below the transition flow path 1316. However, the vertical alignment alone is not sufficient to establish flow. The movable portion 1400 must be rotated about the vertical axis 1202 until the inlet aperture 1408 aligns with the transition flow path 1316. With this alignment complete, flow can pass from the intake opening 1308 to the outlet opening 1404 without interruption. Thus, the selection of the position of the inlet aperture 1408 establishes the angle at which the movable spout 1200 is "on". In some constructions, more than one inlet aperture 1408 can be provided to allow the movable spout 1200 to be "on" at more than one location. The locations can be selected to assure that the outlet opening 1404 is spaced away from the canister top 1104 when in an on position to facilitate draining of fluid from the canister. In addition, the shape of the inlet aperture 1408 can be adjusted to allow rotation of the movable portion 1400 to also vary the quantity of flow. For example, a triangular opening could be employed such that one vertex rotates into fluid communication with the transition flow path 1316 initially. Further rotation exposes more of the triangular opening, thereby increasing the available flow area and the flow therethrough.

With reference to FIGS. 2-4, the assembly and operation of the filter assembly 200 will be described. As illustrated in FIG. 3, the pump is disposed within the pump housing 204 and is operable to provide a flow of fluid to the pump discharge space 202. The spout 400 is positioned such that the cover 504 of the tube portion 500 covers and substantially seals the opening of the pump discharge space 202 such that water within this space is forced into the spout 400 so long as the spout is not in the off position. Any fluid that cannot flow into the spout 400 flows back into the container 102 and does not pass through the filter. Fluid that enters the spout 400 flows through the angled member 600 and exits the spout 400 via the fluid outlet 414. If the fluid outlet 414 is positioned above the filter space 106 and the filter positioned therein, the fluid passes through the filter and back into the container 102 via the discharge channel 208. If the fluid cannot pass through the filter at the rate at which it is discharged into the filter space 106, the excess fluid will flow through the overflow chute 210 and back into the container 102 without passing through the filter.

Users can adjust the flow rate by moving the angled member 600 along the first axis 406 as described with regard to FIG. 7. In addition, a user can adjust the discharge point by extending the extendable portion 410 along the second axis and/or by rotating the angled member 600 and the extendable portion 410 about the first axis 406. In addition, the spout 400 can be adjusted to discharge fluid to a point outside of the container 102 to remove some of the fluid to allow for a partial fluid change if desired.

Although exemplary embodiments of the invention have been described in detail with reference to certain preferred embodiments, those skilled in the art will understand that variations and modifications exist within the scope and spirit of one or more independent aspects of the invention as described and recited in the following claims.

What is claimed is:

1. An aquarium comprising:
   a container defining a perimeter and an aquarium space;
   a filter space arranged to receive a fluid;
   a filter holder coupled to the container, the filter holder defining the filter space, the filter holder operable to direct the fluid from the filter space into the container;
   a pump operable to draw the fluid from the container; and
   a spout coupled to the pump to selectively receive the fluid, the spout including a first leg that extends along a first axis and a second leg that extends along a second axis and defines an outlet, the spout movable along the first axis between an on position in which fluid from the pump flows through the spout and is discharged through the outlet and an off position in which no fluid flows through the spout, wherein the first leg includes an angled member that is movable within a tube portion having a bottom end, and wherein the angled member includes an aperture that is positioned beyond the bottom end of the tube portion and outside of the tube portion when the spout is in the on position and is sealed within the tube portion when the spout is in the off position to inhibit flow through the aperture.

2. The aquarium of claim 1, wherein the filter holder includes a pump discharge space, and wherein the pump discharges fluid into the pump discharge space and the first leg includes an inlet in fluid communication with the pump discharge space.

3. The aquarium of claim 1, wherein the spout is rotatable 360 degrees about the first axis, and wherein the first axis is normal to the second axis.

4. The aquarium of claim 1, wherein the spout is extendable along the second axis to a desired operating position between a retracted position and an extended position.

5. The aquarium of claim 1, wherein the spout includes an extendable portion, the angled member including a first arm having the aperture formed therein and movably positioned within the tube portion, and a first O-ring positioned on a first side of the aperture to form a first seal between the first arm and the tube portion, the first seal being maintained at all positions between the on position and the off position.

6. The aquarium of claim 5, wherein the angled member includes a second arm sized to receive the extendable portion, the extendable portion movable with respect to the second arm to a desired operating position between a retracted position and an extended position.

7. The aquarium of claim 5, further comprising a second O-ring positioned on a second side of the aperture opposite the first side, the second O-ring positioned to form a second seal between the tube portion and the first arm only when the spout is in the off position.

8. The aquarium of claim 1, wherein when the spout is in the on position, the pump is operable to circulate a maximum quantity of fluid through the filter space and wherein the spout is movable to any position between the off position and the on position to achieve any desired flow rate between zero and the maximum.

9. The aquarium of claim 8, wherein the maximum quantity of fluid is 50 gallons/hour (190 liters/hour).

10. An aquarium comprising:
    a container defining a perimeter and an aquarium space;
    a filter holder disposed within the perimeter and including a filter space, a pump space, and a pump discharge space;
    a pump positioned within the pump space and operable to draw a fluid from the container and discharge the fluid into the pump discharge space; and
    a spout including a first leg that extends along a first axis from an inlet positioned to receive the fluid from the pump discharge space to a bend, and a second leg that extends along a second axis from the bend to an outlet where the fluid is discharged, wherein the first leg includes a tube portion having a bottom end and an angled member that defines an aperture, and wherein the angled member is movable within the tube portion between a retracted position in which the aperture is positioned beyond the bottom end and outside of the tube portion to provide fluid communication between the pump discharge space and the outlet to define an on position, and an extended position in which the aperture is sealed within the tube portion to inhibit fluid communication between the pump discharge space and the outlet to define an off position in which no fluid flows through the spout, the spout further rotatable about the first axis and movable along the second axis from a retracted position to an extended position.

11. The aquarium of claim 10, wherein the spout is rotatable 360 degrees about the first axis, and wherein the first axis is normal to the second axis.

12. The aquarium of claim 10, wherein the spout includes an extendable portion, the angled member including a first arm having the aperture formed therein and movably positioned within the tube portion, the first arm movable with respect to the tube portion between the on position in which the aperture is outside of the tube portion and the off position in which the aperture is fully covered by the tube portion.

13. The aquarium of claim 12, wherein the angled member includes a second arm sized to receive the extendable portion, the extendable portion movable with respect to the second arm to a desired operating position between the retracted position and the extended position.

14. The aquarium of claim 12, further comprising an O-ring positioned between the tube portion and the first arm to form a seal therebetween.

15. The aquarium of claim 10, wherein when the spout is in the on position, the pump is operable to circulate 50 gallons/hour (190 liters/hour) through the filter, and wherein the spout is movable to any position between the off position and the on position to achieve any desired flow rate between zero gallons/hour and 50 gallons/hour (190 liters/hour).

\* \* \* \* \*